J. HARRIS.
Car-Axle Box.

No. 26,673.

2 Sheets—Sheet 1.

Patented Jan. 3, 1860.

Witnesses.
Thos R Roach
P. E. Tschumacher

Inventor.
Joseph Harris

J. HARRIS.
Car-Axle Box.

No. 26,673.

2 Sheets—Sheet 2.

Patented Jan. 3, 1860.

Witnesses.
Thos R Roach
P E Teschemacher

Inventor.
John Harris

UNITED STATES PATENT OFFICE.

JOSEPH HARRIS, OF DORCHESTER, MASSACHUSETTS.

IMPROVEMENT IN RAILROAD-CAR AXLE-BOXES.

Specification forming part of Letters Patent No. 26,673, dated January 3, 1860.

*To all whom it may concern:*

Be it known that I, JOSEPH HARRIS, of Dorchester, in the county of Norfolk and State of Massachusetts, have invented certain new and useful Improvements in Railroad-Car Axle-Boxes, of which the following is a full, clear, and exact description, reference being had to the accompanying drawings, making part of this specification, in which—

Figure 1:
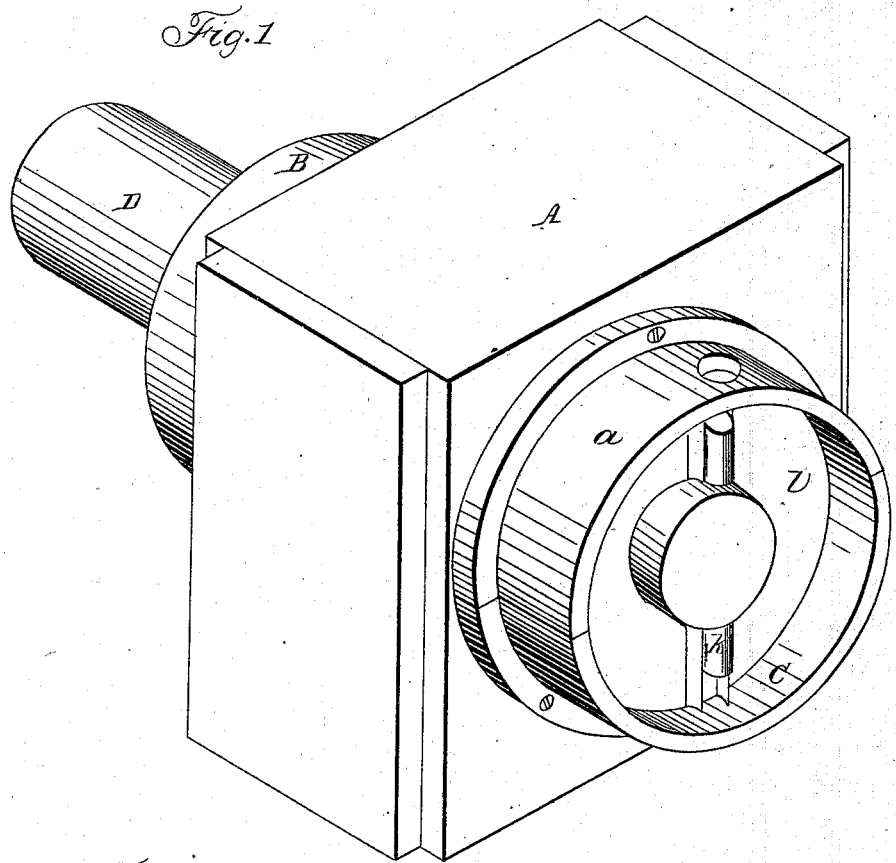
Figure 2:
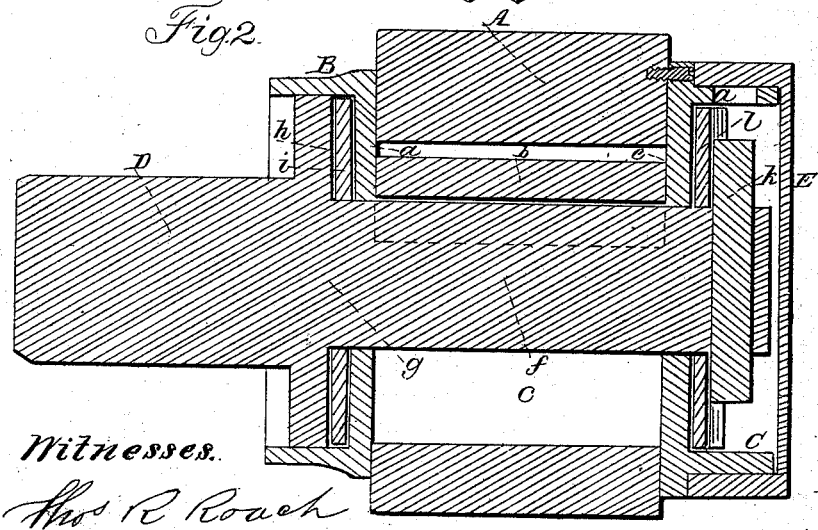
Figure 3:
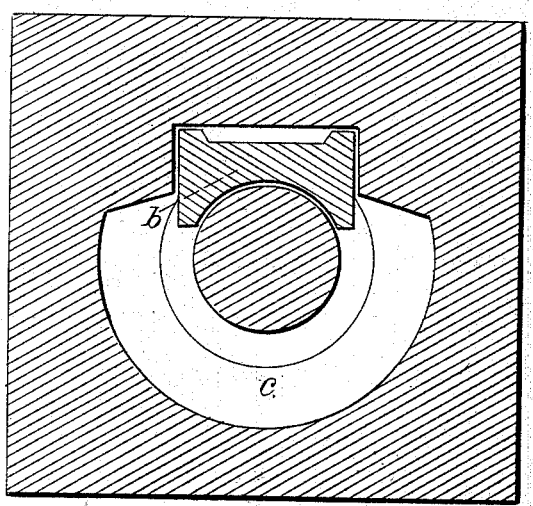
Figure 4:
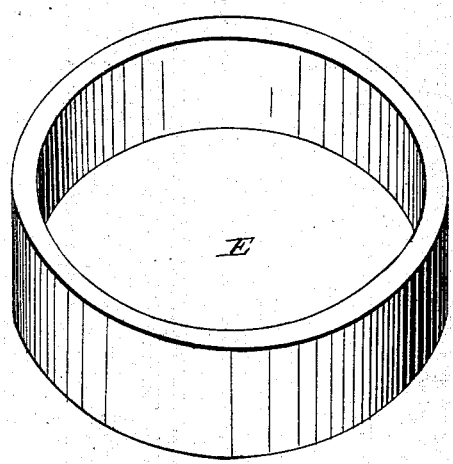

Figure 1 is a view of my improved box; Fig. 2, a section through the same and through the axle, taken longitudinally; Fig. 3, a transverse section of the same; Fig. 4, a detail to be referred to hereinafter.

In the railroad-car axle-boxes with which I am acquainted as at present constructed and in general use the end-thrust of the axle as it plays back and forth longitudinally is received on the soft-metal bearing on which the axle runs, and this metal is soon bruised and worn by it.

To obviate this is the object of my present invention, which consists in so forming a box that it will have a bearing both at front and back to receive the end-thrust of the axle.

That others skilled in the art may understand and use my invention, I will proceed to describe the manner in which I have carried out the same.

In the said drawings, A represents a cast-metal box having a rim or flange B at its rear and another one C at its front end, the latter being formed in two parts, the upper $a$ of which is removable for the purpose of inserting the soft-metal bearing $b$, Figs. 2 and 3, and of packing the space $c$ around the axle. The back $d$ and the front $e$ of the box (part of which is removable with the portion $a$ of the flange) have each a hole in them of sufficient size to receive the portions $f$ of the axle D, which is turned down of a uniform size from the point $g$ to the end of the axle. The collar, which is usually formed on the end of the axle, is in this case dispensed with, so that the axle can be inserted from the rear end of the box through a hole of the same size as the part of the axle which rests upon the bearings in the box. A collar $h$ is shrunk on the axle at $g$ immediately back of where the axle is turned down. A washer $i$, of brass or other suitable material, is inserted between the collar $h$ and the back $d$ of the box, and a similar washer $l$ is placed between the front $e$ of the box and a strong steel pin $k$, which is inserted in a hole near the end of the axle. Instead of the pin $k$ a screw-nut may be placed on the end of the axle. A cap E (detached in Fig. 4) fits over the flange C to exclude the dust from the bearings.

With a box constructed as above described I obtain not only the required bearings at $d$ and $e$ to receive the end-thrust of the axle, but I have also a box which is particularly tight and capable of excluding dust from the bearings on which the axle runs. This advantage I obtain principally by dispensing with the collar at the end of the axle, so that it can be inserted in holes at the front and back of the box of corresponding size with the portion $f$ of the axle. This also avoids the necessity of wedging over the soft-metal bearing to bring it down onto the portion $f$ of the axle, as is the case in some boxes of this class—for example, in that known as the "Lightner" box.

What I claim as my invention, and desire to secure by Letters Patent, is—

In combination with an axle-box in which the journal of the axle is inserted endwise and in which the soft-metal bearing may be also inserted from the end, the front and back bearings $d\ e$ and flanges $h\ k$ for receiving the end-thrust of the axle and thus protecting the soft-metal bearing, substantially as described.

JOSEPH HARRIS.

Witnesses:
   THOS. R. ROACH,
   P. E. TESCHEMACHER.